Nov. 26, 1963    S. BRANMAN ET AL    3,111,810
STARTING DEVICE

Filed Feb. 21, 1961    2 Sheets-Sheet 1

INVENTOR.
SOLOMON BRANMAN
RAYMOND J. MELCHIONE
BY
D. Gordon Argus
ATTORNEY

INVENTOR.
SOLOMON BRANMAN
RAYMOND J. MELCHIONE

BY

ATTORNEY

United States Patent Office 3,111,810
Patented Nov. 26, 1963

3,111,810
STARTING DEVICE
Solomon Branman, Sacramento, and Raymond J. Melchione, Lancaster, Calif., assignors to Aerojet-General Corporation, Azusa, Calif., a corporation of Ohio
Filed Feb. 21, 1961, Ser. No. 90,793
5 Claims. (Cl. 60—39.47)

This invention relates to starter engines and more particularly to a starter for a rocket motor which operates by discharging a stream of hot gases into the rocket motor combustion chamber.

In the past, engines or motors have been started by discharging hot gases into the combustion chamber or cylinder by means of a powder charge or another gas generating substance. The use of the powder charge created the danger that an accidental detonation in the starter could either start the motor prematurely or cause damage. Consequently prior engine starters of this type, as exemplified in U.S. Patent No. 876,240, were provided with a valve controlled vent. In one valve position, the chamber containing the gas generating substance was vented to the ambient air so that an accidental ignition in the starter could not operate the engine. When the valve was moved so the vent was closed, the chamber containing the gas generating substance communicated with the combustion chamber or engine cylinder. Then if the substance was ignited, the hot gases were directed into the motor to start it.

It would be desirable to be able to use engine starters of this kind with rocket motors, but engine starters previously constructed were unsuitable for this purpose, because the valve control was exposed to the high gas pressure developed in the engine cylinder or combustion chamber. To prevent blow-by through the engine starter, a packing or seal had to be mounted on the valve control which was strong enough to withstand the pressure in the combustion chamber. This made the valve control harder to move because of increased frictional resistance. This resistance was not very important in conventional engines because the pressures developed are much lower than the pressures developed in the combustion chambers of rocket motors. Consequently a seal or packing for a valve control strong enough to withstand the pressure in the combustion chamber of a rocket motor would also substantially increase the frictional resistance in the valve control making it much harder to move. To overcome this resistance, the actuating mechanism had to be more powerful and in practice this meant the mechanism had to be heavier. Since the engine starter is carried along with the rocket, this additional weight is undesirable. In addition, the high frictional resistance in the valve control caused a serious time delay in the response of the valve control to actuation.

If the engine starter could be constructed so the valve control is isolated from the combustion chamber, the valve control would not require a packing or seal because it would not be exposed to the pressure in the combustion chamber. Consequently the valve control could be designed so its movement is comparatively friction-free. If this is done, the mechanism for actuating the valve control could be less powerful and lighter. In addition, the low frictional resistance in the valve control would eliminate any appreciable time delay in the response of the valve control to actuation. What is needed, therefore, and comprises a principal object of this invention is to provide an engine starter having the above described features.

In its principal aspect, the present invention comprises a housing adapted to receive gas generating squibs. Two pistons inside the housing are positioned by coil springs to close off a vent hole and a firing hole respectively. When the squibs are detonated, depending on the position of the valve control, the vent hole is adapted to vent the hot gases to the atmosphere or the firing hole is adapted to direct these hot gases to the propellant in the rocket motor combustion chamber for the ignition thereof. A valve control or a lock gate, isolated from the rocket motor combustion chamber is provided. This valve control is movable between a safe position and a starting position. In the safe position, only one piston can recoil to uncover the vent hole when the squibs are fired. In the starting position only the other piston can recoil to uncover the firing hole. The valve control does not have to be sealed because it is isolated from the pressure in the combustion chamber of the rocket motor by an O-ring around one of the pistons. Consequently, the frictional resistance of the valve control to movement can be made as small as desired.

These and other objects, features, and advantages of the present invention will be apparent to those skilled in the art from the following more detailed description taken in conjunction with the appended drawings wherein.

Figure 1:
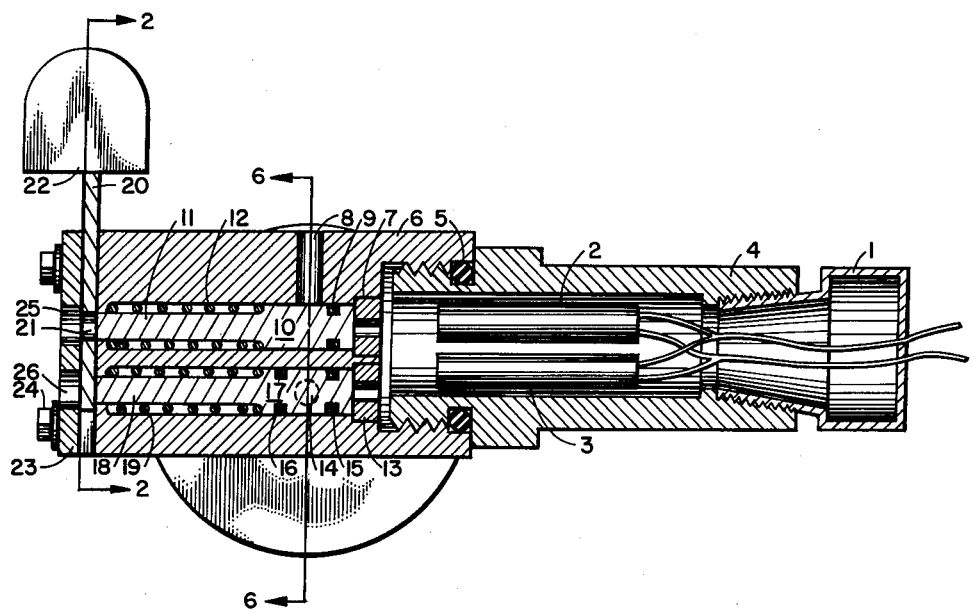
FIG. 1 is a side sectional view of the engine starter of the present invention.
Figures 2, 3:
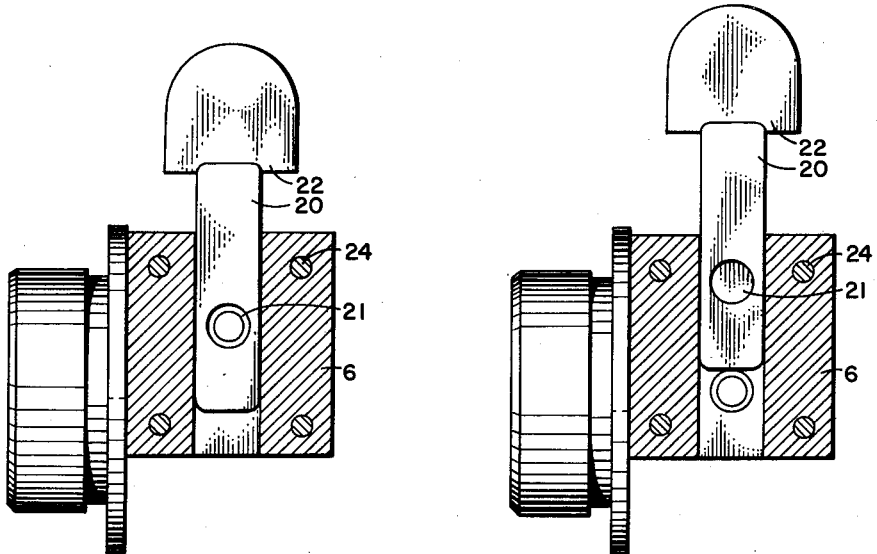
FIG. 2 is a sectional view of the engine starter taken along the line 2—2 of FIG. 1 and showing the valve control in the safe position.
FIG. 3 is a sectional view of the engine starter like that shown in FIG. 2 but with the valve control in starting position.

Referring now to FIGS. 1, 2, and 3, the engine starter comprises a unit having two subhousings 4 and 6. Squibs 2 and 3 are contained in squib housing 4 which is interconnected with piston housing 6 by suitable gas flow channels in plugs 7 and 13. The piston housing 6 is provided with a vent passage 8 to the ambient air for "safe" firing and a firing passage or hole 14 adapted to lead to the combustion chamber of the rocket motor. A hermetic seal 1 is threaded into the squib housing 4 which contains squibs 2 and 3. The squib housing 4 is threaded into a piston housing 6 and sealed by an O-type resilient ring 5. The "safe" piston 10, movably mounted in the piston housing 6, normally covers a vent hole 8 (best seen in FIG. 4).

A coil spring 12 bearing against a surface in the housing and an enlarged portion of the piston 10 biases the piston against retainer plug 7 normally closing off the vent hole 8. In addition, an O-type ring seal 9 encompasses the piston 10 and protects squibs 2 and 3 in the squib housing 4 from atmospheric humidity. The starting piston 17 is similarly biased against retainer plug 13 by a coil spring 19 encompassing the plunger 18. In this position, the piston 17 covers the firing hole 14 which is adapted to communicate with the combustion chamber of the rocket motor. A valve control which, in this embodiment, is a simple bar 20 containing a piston pass hole 21, is actuated by any suitable means, as exemplified by actuator 22 and is slidably secured to the piston housing 6 by a closure plate 23 and cap screws 24.

Figure 4:
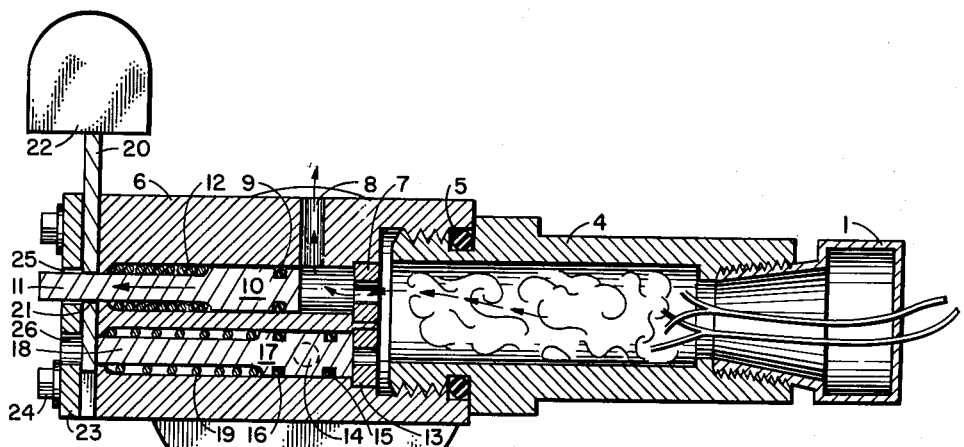
FIG. 4 is a side sectional view of the engine starter showing piston movement and gas flow when the squibs are fired when the valve control is in the safe position.

Referring now to FIG. 4 the action resulting from the firing of the squibs when the device is in the safe position is as follows: The valve control 20 is placed in the position (shown in FIG. 4) wherein the pass hole 21 is aligned with plunger 11 of piston 10. As the squibs 2 and 3 are ignited the piston 17 which closes the firing hole 14 to the combustion chamber of the rocket motor is prevented from movement by bar 20. The plunger 11 of the safe piston 10 which closes the vent hole 8 is free to recoil and moves through the pass hole 21 in the valve control 20 and aperture 25 in closure plate 23. In doing so, vent hole 8 is uncovered and the squib gases are allowed to vent safely to the atmosphere in the direction of the heavy arrow (as shown in FIG. 4).

Figure 5:
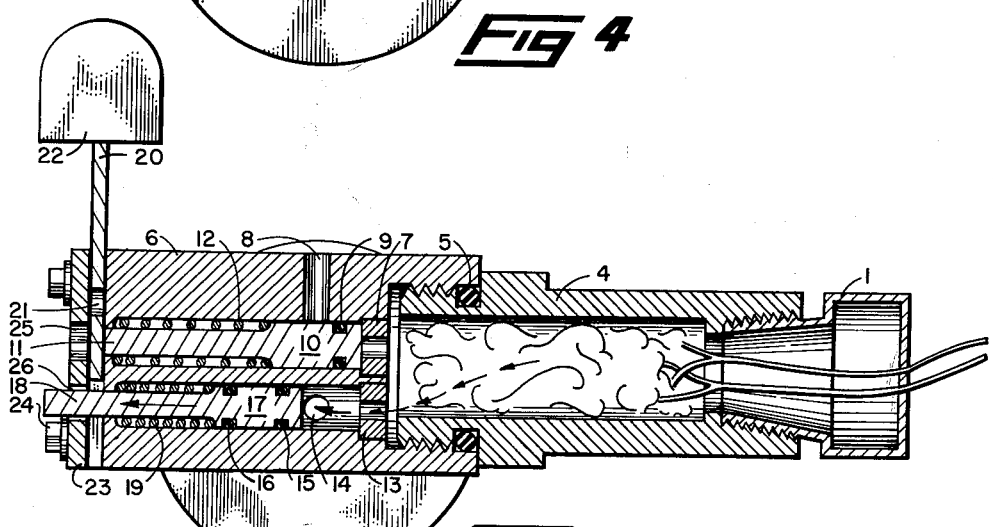
FIG. 5 is a side sectional view of the engine starter like that of FIG. 4 showing piston movement when the squibs are fired when the valve control is in starting position.
Figure 6:
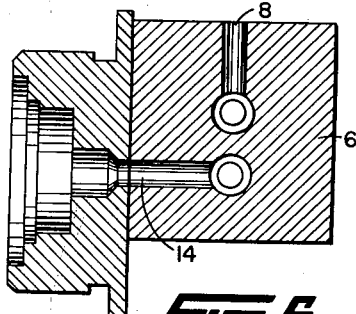
FIG. 6 is a sectional view of the engine starter taken along line 6—6 of FIG. 1.

Referring now to FIG. 5, the action resulting from firing of the squib when the device is in the arm position, is as follows: The actuator 22 moves valve control 20 upward so the valve control cannot obstruct plunger 18 of piston 17. This movement of the valve control 20 locks piston 10 in position. With this arrangement the piston 17 is free to recoil through an aperture 26 in the closure plate 23, thereby uncovering firing hole 14. The hot gases develop when the squibs are fired then flow through the firing hole 14 into the combustion chamber of the rocket motor to start it, as shown by the heavy arrow in FIG. 5. As seen, O-ring 15 on piston 17 is like O-ring 9 on piston 10 and keeps the interior of the squib housing 4 sealed before firing. O-ring 16 on piston 17 has a different function in that it serves to prevent the high pressure exhaust gases developed in the combustion chamber of the rocket motor from blowing out between the surface of valve 17 and the cylindrical surface in which it moves. This arrangement effectively isolates valve control 20 from the pressure in the combustion chamber so that the valve control requires no seal or packing. Consequently, the valve control will offer little frictional resistance to the movement and its response to actuation will be immediate.

Although the present embodiment of this invention was designed as a starter for rocket motors, it is apparent that its simplicity and inherent reliability make it useful for starting other kinds of motors and engines. In the present embodiment, the squibs and the control pistons are kept together in the device. This is not a necessary arrangement and if further safety is desired during the logistic phase of the life of the rocket motor, the squibs and the control pistons could be contained in separate housings or cartridges.

It is to be understood that the form of the invention herewith shown and described is to be taken as a preferred example of the same, and that various changes in the shape, size, and arrangement of the parts may be resorted to without departing from the spirit of this invention or the scope of the claims.

We claim:

1. A propellant initiating device for a motor comprising: a housing adapted to contain gas producing means, another housing provided with cylinders, said housings being interconnected to provide a gas flow channel therebetween, each of said cylinders being exposed to said gas producing means through said interconnecting channel, at least one of said cylinders being provided with a vent passage to the ambient air, and at least another of said cylinders being provided with a passage adapted to communicate with a propellant in the combustion chamber of the motor, a piston arranged in each of said cylinders, said pistons normally covering said passages, and external means pressure isolated from the propellant in the combustion chamber of the motor when the motor is operating for selectively permitting one or another of said pistons in said cylinders to move a distance sufficient to expose one or another of said passages upon operation of said gas producing means.

2. In combination: a first housing adapted to contain a gas producing means, a second housing provided with a plurality of movable members, said second housing being provided with a first outlet passage and a second passage adapted to communicate with a propellant in the combustion chamber of a motor, said passages being normally closed by said movable members, said movable members being exposed to said gas producing means by a channel between said first and second housings, and external means pressure isolated from the propellant in the combustion chamber of the rocket motor when the motor is operating for selectively permitting one or the other of said movable members to travel a distance exposing either said first or said second passages upon operation of said gas producing means.

3. In combination: means adapted to house a means for gaseous pressure generation, other means adapted to house a plurality of movable members, means for gaseous pressure flow interconnecting said housing means, said other housing means being provided with means for expulsion of pressure to the ambient air and still another means for exposing a propellant to pressurized gas from said generation means, said pressure expulsion means and propellant exposure means normally being obstructed by said movable members, said movable members being exposed to said means for gaseous pressure generation by said means for gaseous pressure flow between said housing means, and external means pressure isolated from said propellant when the propellant is burning for selectively permitting a single member of said plurality of movable members to be actuated by operation of said gaseous pressure generation means, whereby movement of one of said members will remove the obstruction of said propellant exposure means, and movement of another of said members will remove the obstruction of said pressure expulsion means.

4. A propellant initiating device comprising: a housing adapted to contain a means for producing gas, another housing provided with means for receiving movable members, movable members arranged within said other housing means, said housings being interconnected to provide a means for gas flow therebetween, each of said movable members being exposed to said gas producing means through said means for gas flow, said other housing being provided with at least one gas flow passage to the ambient air and at least one gas flow passage adapted to communicate with a propellant, said movable members being arranged in said other housing to normally cover said gas flow passage to the ambient air and said gas flow passage adapted to communicate with a propellant, and external means pressure isolated from said propellant when the propellant is burning for selectively permitting one or another of said movable members to travel a distance exposing one or another of said gas flow passages upon operation of said gas producing means.

5. A propellant initiating device comprising: a housing, gas producing explosive squibs arranged in said housing, an hermetic seal retaining said squibs in said housing, another housing provided with cylinders, said housings being threadably interconnected to provide a gas flow channel therebetween, an annular sealing ring between said housings, retaining members provided with orifices, each of said orifices providing a gas flow channel between said gas flow channel and each of said cylinders, each of said cylinders being exposed to said gas producing means through said interconnecting channels, at least one of said cylinders being provided with a vent passage to the ambient air, and at least another of said cylinders being provided with a passage adapted to communicate with a propellant, a piston provided with a plunger arranged in each of said cylinders, annular sealing rings encompassing each of said pistons to make a pressure-tight seal with each cylinder wall, a resilient annular spring encompassing each of said piston plungers to position said pistons to normally cover said passages, a slide bar having apertures for one or another of said piston plungers, a closure plate attached to said housing securing said slide bar thereto, said slide bar permitting one or another of said pistons to axially travel a distance exposing one or another of said passages upon operation of said gas producing squibs, whereby said piston plunger recoils through one or another of said piston apertures upon actuation of said gas producing explosive squibs.

References Cited in the file of this patent

UNITED STATES PATENTS

| | | |
|---|---|---|
| 2,563,265 | Parsons | Aug. 7, 1951 |
| 2,831,498 | Thomsen | Apr. 22, 1958 |
| 2,935,846 | Neale | May 10, 1960 |

FOREIGN PATENTS

| | | |
|---|---|---|
| 965,277 | Germany | June 6, 1957 |